US012654120B2

(12) United States Patent
    Smith et al.

(10) Patent No.:    US 12,654,120 B2
(45) Date of Patent:        Jun. 16, 2026

(54) FILTERED MEDIA BASKET FOR AIR PURIFIER

(71) Applicant: BISSELL Inc., Grand Rapids, MI (US)

(72) Inventors: Derek Smith, Grand Rapids, MI (US);
        Habib Baydoun, Dearborn Heights, MI
        (US); Bryan Todd Jones, Holland, MI
        (US)

(73) Assignee: BISSELL Inc., Grand Rapids, MI (US)

( * ) Notice:    Subject to any disclaimer, the term of this
        patent is extended or adjusted under 35
        U.S.C. 154(b) by 535 days.

(21) Appl. No.: 18/322,033

(22) Filed:    May 23, 2023

(65)                Prior Publication Data

US 2023/0381704 A1        Nov. 30, 2023

Related U.S. Application Data

(60) Provisional application No. 63/346,085, filed on May
    26, 2022.

(51) Int. Cl.
    *B01D 46/00*        (2022.01)
    *B01D 46/24*        (2006.01)
    *B01D 53/04*        (2006.01)

(52) U.S. Cl.
    CPC ..... *B01D 46/0036* (2013.01); *B01D 46/0047*
        (2013.01); *B01D 46/24* (2013.01); *B01D*
        *53/0446* (2013.01); *B01D 2257/708* (2013.01);
        *B01D 2257/90* (2013.01); *B01D 2257/91*
                                (2013.01)

(58) Field of Classification Search
    None
    See application file for complete search history.

(56)                References Cited

U.S. PATENT DOCUMENTS 2,228,479  A  *  1/1941   O'Grady ............... G03B 33/08
                                            359/887
    9,527,353  B2 * 12/2016   Bennett ................. B60C 23/123
    2018/0149119 A1*  5/2018  Morikawa .......... B01D 46/0036
    2020/0047103 A1*  2/2020  Hasenfratz ......... B01D 46/0005
    2023/0073240 A1*  3/2023  Yang ................... B01D 53/007
    2024/0042384 A1*  2/2024  Smith ................... B01D 46/10

FOREIGN PATENT DOCUMENTS

CA        3138793  A1 *  5/2022   ............. F24F 9/127
    CN      108119267  B  *  6/2020   ............. B01D 46/62
    DE   102017010349  A1 *  5/2019   ............. B01D 46/60
    JP      H0349396  U  *  5/1991
    WO   WO-2006061803  A1 *  6/2006  ............. A61L 9/127

* cited by examiner

*Primary Examiner* — Brit E. Anbacht
(74) *Attorney, Agent, or Firm* — Quinn IP Law

(57)                ABSTRACT

A media basket assembly for use with an air purifier, such as
but not necessarily limited to media basket assembly suit-
able for use with a vertical airflow type of air purifier. The
media basket assembly may include a filter media config-
ured to filter the airflow and a basket for positioning the filter
media relative to a lower fan shroud of the air purifier.

13 Claims, 11 Drawing Sheets

A-A

FILTERED MEDIA BASKET FOR AIR PURIFIER

CROSS-REFERENCE TO RELATED APPLICATIONS

This application claims priority to and the benefit of U.S. Provisional Application Ser. No. 63/346,085 filed on May 26, 2022, which is hereby incorporated by reference in its entirety herein.

TECHNICAL FIELD

The present disclosure relates to filtered media baskets suitable for use with air purifiers, such as but not necessarily limited to filtered media baskets configured for use with vertical airflow air purifiers.

BACKGROUND

An air purifier may be characterized as a device configured to direct airflow through a filter media for purposes of filtering, removing, eliminating, and/or otherwise manipulating contaminants, particulates, volatile organic compounds (VOCs), allergens, pollutants, pollen, mold spores, bacteria and/or virtually any other type of airborne atom, molecule, etc. included therein. The filter media may be comprised of a variety of materials, compositions, substances, etc. depending on the application to be performed such that the makeup and construction of the filter media may vary on a case-by-case basis according to the type of purification to be performed. Despite this variability in composition and construction, many filter media share a common operational requirement to be positioned within an air purifier at a desired location, and optionally, at a location within one or more passageways used to direct airflow for purification.

BRIEF SUMMARY

One non-limiting aspect of the present disclosure contemplates a media basket configured to position various types of filter media within an air purifier. The media basket may be suitable for use with different types of air purifiers, and particularly with vertical airflow air purifiers. The vertical airflow air purifier may include a motorized fan assembly within an upper chamber to draw airflow from a lower chamber for purification. The media basket may be particularly beneficial in improving and maximizing filtering capabilities of such an air purifier due to the media basket being attachable to a lower fan shroud positioned in a central passageway used by the motorized fan to draw the airflow from the lower chamber. The capability to position the media basket and the included filter media relative to the central passageway advantageously maximizes interaction between the filter media and the airflow for optimal performance and purification.

The media basket may be configured to snap fit into the purifier, optionally as an aftermarket component, such as to facilitate odor removal with refillable filter media and/or to add fragrance to a room with scented granules, disks, or other materials suitable for carry therein. One non-limiting aspect of the present disclosure contemplates the vertical airflow air purifier also including a lower chamber filter operating in cooperation with the media basket. The lower chamber filter may include an additional filter media (chamber filter media), which when coupled with the filter media of the media basket (basket filter media), provides multiple filter medias, optionally of different types. The lower chamber filter may be positioned relative to perforations used for air intake from an ambient environment such that the airflow drawn through the perforations may pass initially through the chamber filter media and thereafter through the basket filter media before finally being exhausted by the motorized fan assembly through slots or openings within the upper chamber. The media basket may attach to the lower fan shroud in a nested manner whereby the basket filter media fits within a hollow interior of the lower chamber filter, optionally in a concentric manner with the lower chamber filter and the central opening.

One non-limiting aspect of the present disclosure relates to a vertical airflow air purifier. The purifier may include a housing, a divider separating an interior volume of the housing into an upper chamber and a lower chamber with the divider including a central opening to provide an airflow passageway between the upper and lower chambers. The purifier may additionally include a motorized fan assembly disposed within the upper chamber above the central opening with the motorized fan being configured to draw air from the lower chamber. The purifier may additionally include a lower fan shroud disposed between the fan assembly and the divider with the fan shroud having a covering portion configured to cover a cross-sectional area of the central opening and with the covering portion including a plurality of gaps to permit airflow therethrough. The purifier may additionally include a media basket attached to the fan shroud with the media basket including a basket filter media to filter airflow passing through the gaps.

One non-limiting aspect of the present disclosure relates to a media basket assembly for use with an air purifier. The assembly may include a filter media configured to filter airflow through the air purifier and a basket configured to attach to a lower fan shroud of the air purifier with the filter media being disposed within an interior volume of the basket.

One non-limiting aspect of the present disclosure relates to a media basket assembly for use with an air purifier of the type with the air purifier being of the type having a motorized fan disposed within a housing above a divider, with the divider having a circular opening to provide an airflow passageway between upper and lower chambers of the housing, with the air purifier including a lower fan shroud having a covering portion shaped to cover a cross-sectional area of the circular opening, and with the covering portion including a plurality of spars to structurally support and radially offset a plurality of concentric annular rings such that gaps therebetween provide empty spaces for airflow. The media basket assembly may include a filter media configured to filter airflow through the air purifier with the filter media having a cross-sectional width shaped to cover substantially all of the cross-sectional area of the covering portion. The media basket assembly may additionally include a basket configured to position the filter media relative to the gaps with the basket including the filter media disposed within an interior and a plurality of arms longitudinally extending from an exterior such that the arms are shaped to fit through the gaps to position a distal end to snap fit the basket to the fan shroud.

The above features and advantages and other features and advantages of the present teachings are readily apparent from the following detailed description of the modes for carrying out the present teachings when taken in connection with the accompanying drawings. It should be understood that even though in the following Figures embodiments may be separately described, single features thereof may be combined to additional embodiments.

BRIEF DESCRIPTION OF THE DRAWINGS

The drawings described herein are for illustrative purposes only, are schematic in nature, and are intended to be exemplary rather than to limit the scope of the disclosure.

DETAILED DESCRIPTION

Figure 1:
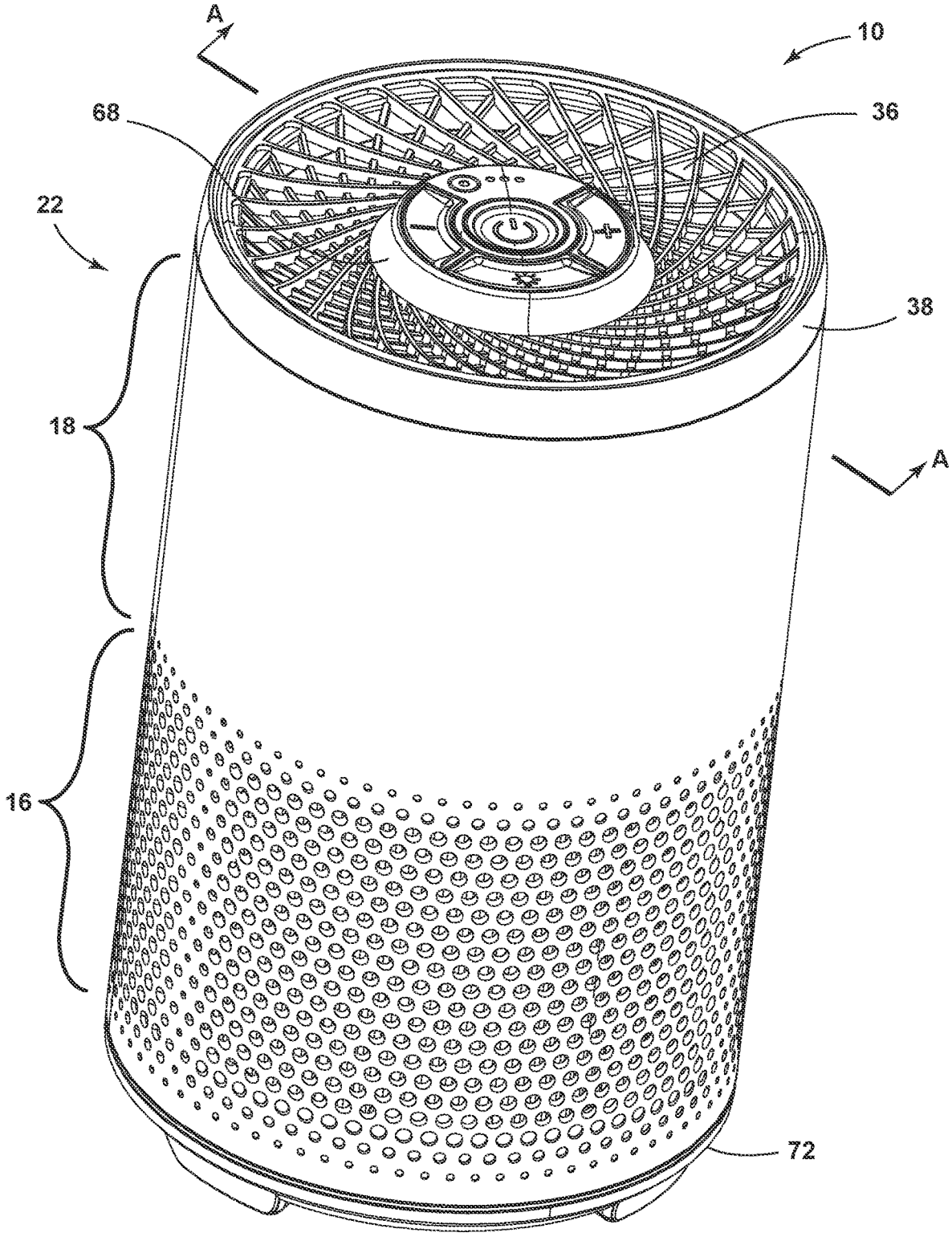
FIG. 1 illustrates a perspective view of an air purifier in accordance with one non-limiting aspect of the present disclosure.
Figure 2:
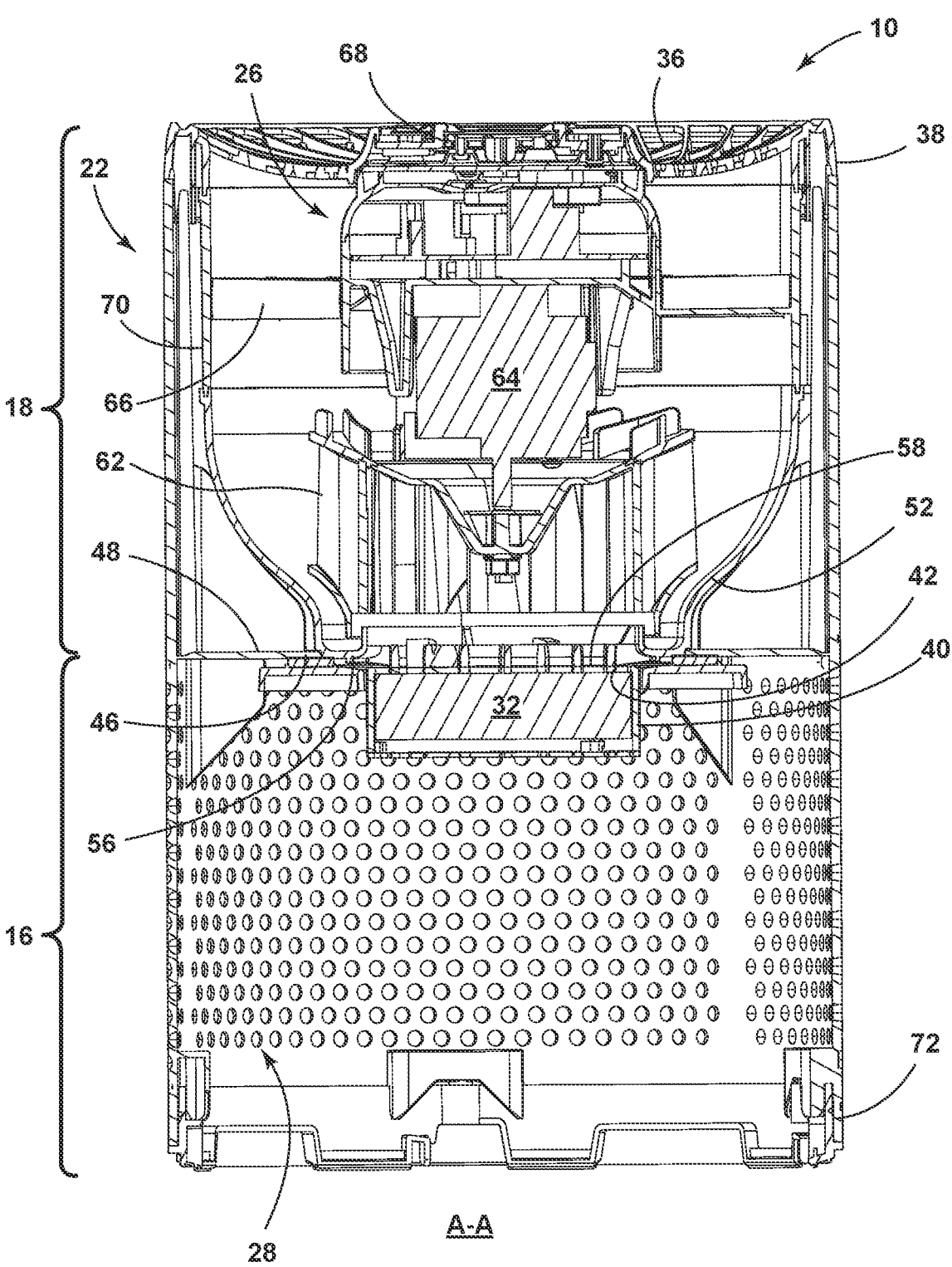
FIG. 2 illustrates a cross-sectional view of the air purifier in accordance with one non-limiting aspect of the present disclosure.

FIG. 1 illustrates an air purifier 10 in accordance with one non-limiting aspect of the present disclosure. The air purifier 10 may be characterized as a vertical airflow air purifier 10 due to the purification occurring while an airflow passes in a generally vertical direction through a housing 22 between a lower chamber 16 and an upper chamber 18. FIG. 2 illustrates a cross-sectional view A-A of the air purifier 10 where the vertical alignment of the lower and upper chambers 16, 18 and the internal componentry can be seen in more detail. The airflow through the housing 22 may be facilitated with a motorized fan assembly or blower 26 configured to provide a vacuum or other type of suction sufficient to circulate airflow from an ambient environment. The airflow may be drawn in through perforations 28 in the lower chamber 16 and thereafter interfaced with a basket filter media 32 before being exhausted through the upper chamber 18 to slots or other ambient openings 36 included within a cap 38.

One non-limiting aspect of the present disclosure contemplates the basket filter media 32 being included within a confined space of a media basket 40 whereby the media basket 40 may be configured as described herein to position the basket filter media 32 within the housing 22 between the lower and upper chambers 16, 18 where interaction with the airflow may be beneficial, such as in a passageway 42 or other confluence therebetween. The media basket 40 is predominantly described with respect to being positioned within a central opening 46 of a divider 48 used to separate the housing 22 into the lower and upper chambers 16, 18 for exemplary non-limiting purposes as the present disclosure fully contemplates its use and application in positioning the media basket 40 at other locations within the housing 22. The present disclosure also fully contemplates the purifier including multiple media baskets 40 and/or multiple basket filter medias 32, optionally of differing sizes and materials.

The positioning of the media basket 40 may be achieved with attachment to a lower fan shroud 52 connected to either or both of the divider 48 and/or the housing 22. The lower fan shroud 52 may include a covering portion 56 shaped to cover an entirety or at least a substantial portion of the central opening 46, e.g., the covering portion 56 may be an integral part of the lower fan shroud 52 shaped to fit within the central opening 46. The covering portion 56 may include a plurality of relatively narrow gaps 58 capable of permitting airflow therethrough while limiting debris or other items from passing. The covering portion 56 may be beneficial in protecting louvers, blades, turbines, propellers, or other features of the motorized fan assembly 26, which is shown to principally include a plurality of airflow directors 62, an electric motor 64, a plurality of rotating fan blades 66, and a push-button controller/interface 68. The lower fan shroud 52 may cooperate with an upper fan shroud 70 to effectively enclose the motorized fan assembly 26 within a protective structure. The upper fan shroud 70 may be connected to either one or both of the lower fan shroud 52 and the housing 22 and similarly include gaps or other openings sufficient to facilitate exhausting airflow to the slots 36.

Figure 3:
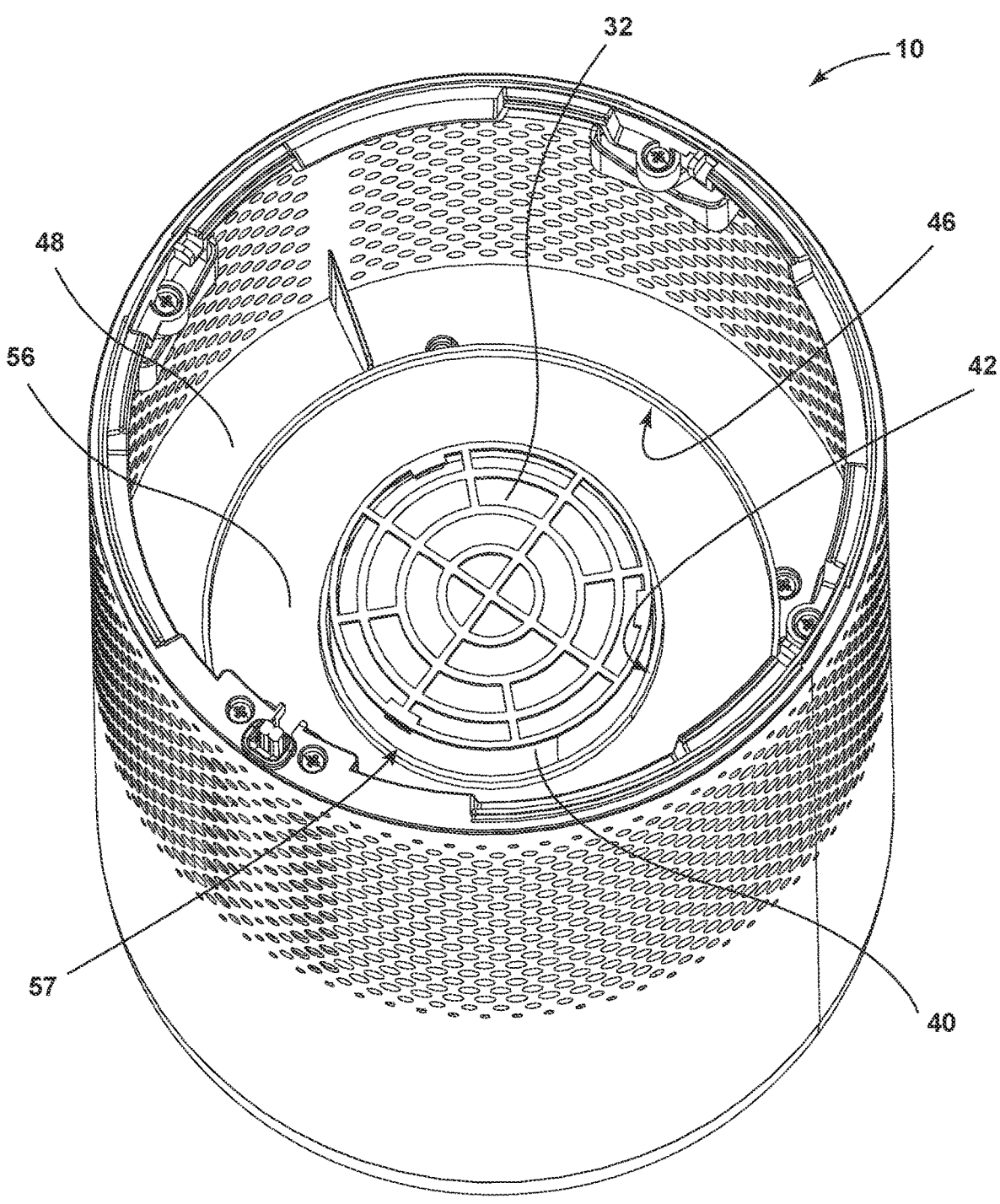
FIG. 3 illustrates a perspective end view of the air purifier after removing a base in accordance with one non-limiting aspect of the present disclosure.

FIG. 3 illustrates a perspective end view of the air purifier 10 after removing a base 72 of the housing 22. The media basket 40 is shown to be covering an entire cross-sectional area of a portion of the covering portion 56 having the gaps 58, i.e., the passageway 42 between the lower and upper chambers 16, 18, such that a portion of the airflow passes through the basket filter media 32 for purification, other than a potentially slight amount of airflow that may, if at all, slip through slight crevices between adjoining surfaces of the media basket 40 and the lower fan shroud 52. A space 57 may optionally be included to facilitate a space for air to flow around the media basket 40 such that all the air need not necessarily pass through the media basket 40 before exhausting. The space 57 may assist in assuring enough air flows through the purifier 10 as too little airflow may potentially limit efficiency of the purification. The functionality of the air purifier 10 with respect to purifying airflow, or more particularly the effects of the basket filter media 32 on airflow, are intended to encompass filtering, removing, eliminating, and/or otherwise manipulating contaminants, particulates, volatile organic compounds (VOCs), allergens, pollutants, pollen, mold spores, bacteria and/or virtually any other type of airborne atom, molecule, etc.

Figure 4:
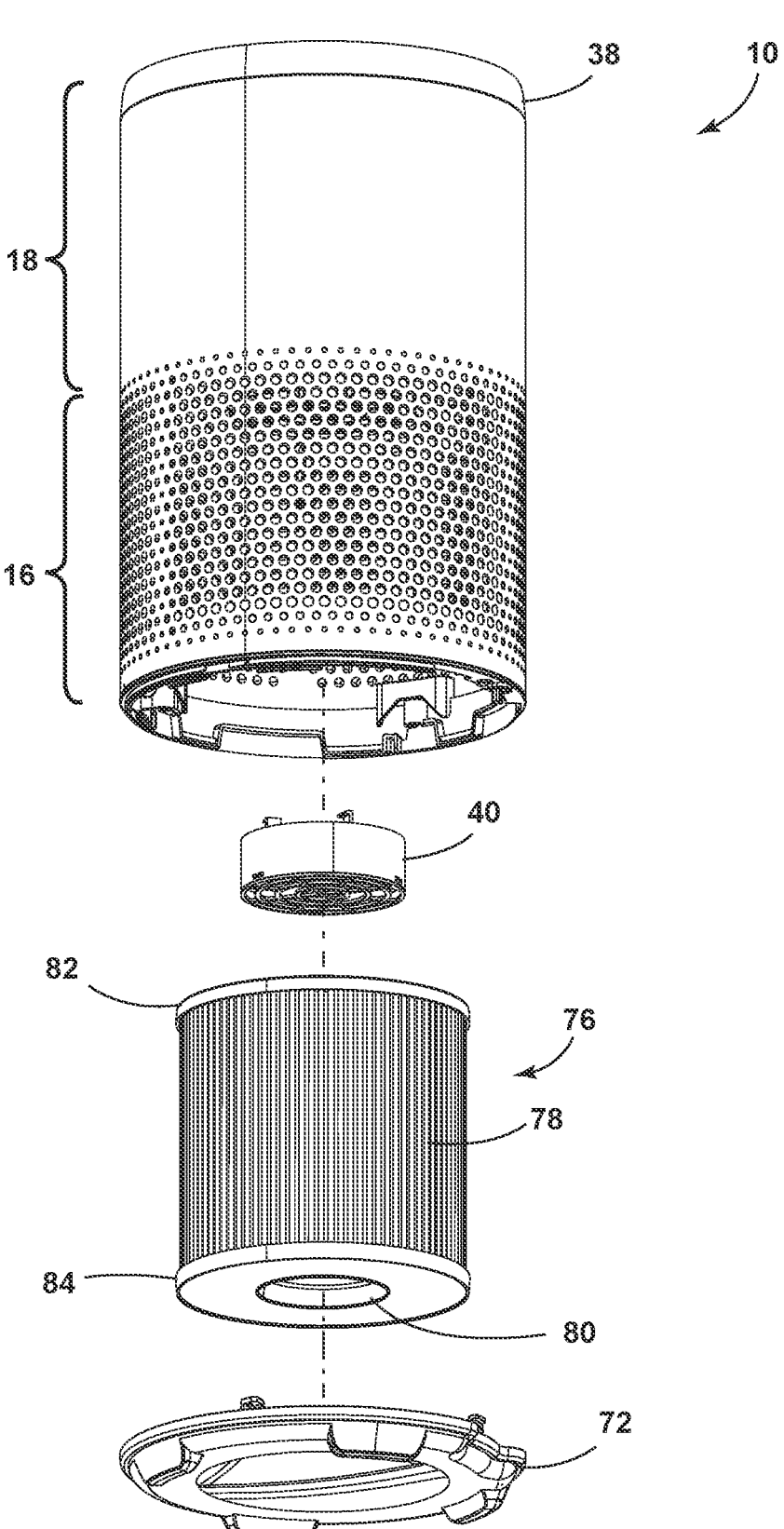
FIG. 4 illustrates an exploded view of the air purifier including an additional filter in accordance with one non-limiting aspect of the present disclosure.

FIG. 4 illustrates the air purifier 10 including an additional filter 76 in accordance with one non-limiting aspect of the present disclosure. The additional filter (lower chamber filter) 76 may include an additional filter media (chamber filter media) 78 to provide additional purification in compliment to the purification provided with the filter media (basket filter media) 32 of the media basket 40, such as to enhance purification with the use of multiple filter medias 32, 78, optionally of different types. One non-limiting aspect of the present disclosure contemplates the lower chamber filter 76 being a 3-in-1, high-efficiency particulate air (HEPA) filter where the chamber filter material 78 includes a prefilter and a combo activated carbon and pleated high efficiency filter. In this regard, the filter 76 is illustrated as having three layers for exemplary purposes whereby the three layers can be coupled together or formed and mounted as individual pieces. An outside layer can be a non-woven pre-filter, a middle layer can include a pleated filter of a High Efficiency Particulate Air (HEPA) filter, and an inner layer can be a carbon sponge or alternatively a carbon layer woven into the middle layer.

The filter medias 32, 78 may be configured to remove odors from the air being exhausted from the air purifier 10 and may capture, absorb, and/or remove odor causing VOCs. In certain embodiments, the filter medias 32, 78 may be chosen from carbon, zeolite (understood to include at least zeolite X, zeolite Y, ultrastable zeolite Y, ZSM zeolite, offretite, and beta zeolite, among others), silica gel, faujasite, chabazite, clinoptilolite, mordenite, silicalite, metal organic frameworks, metal oxide, polymers, resins, and combinations thereof, such as activated carbon pellets mixed with zeolites specific to ammonia removal. The type of filter medias 32, 78 may be based on what is desired to be filtered out of the air, i.e., the type of contaminant removed from the airflow path, which may optionally include one of the medias 32, 78 removing one type of contaminate and the other removing another. For instance, the pre-filter of the chamber filter media 78 may be configured to block larger airborne debris like dander, such as in the event the chamber filter media 78 filters out airborne particles of about 0.3 microns or larger, with the included carbon optionally filtering the VOCs. The basket filter media 32 may have a secondary material configured to filter out other contaminates according to user desire, e.g., to enable a user to refill, optionally with aftermarket components, the basket filter media 32 to remove a particular contaminate and/or to add fragrance beads, such as with a mixture of carbon and zeolites.

The lower chamber filter 76 may include a longitudinal length sufficient to extend as shown throughout the lower chamber 16 such that the airflow drawn through the perforations 28 passes initially through the chamber filter media 78 and thereafter through the basket filter media 32 before finally being exhausted by the motorized fan assembly 26 through the slots or openings 36 within the upper chamber 18. The media basket 40 may attach to the lower fan shroud 52 in a nested manner whereby the media basket 40 fits within a hollow interior 80 of the lower chamber filter 76, optionally in a concentric manner with both the lower chamber filter 76 and the central opening 46. The lower chamber filter 76 may include gaskets and/or seals 82, 84, such that essentially all airflow through the perforations 28 contacts the chamber filter media 78 before continuing vertically through the hollow interior 80.

Figure 5:
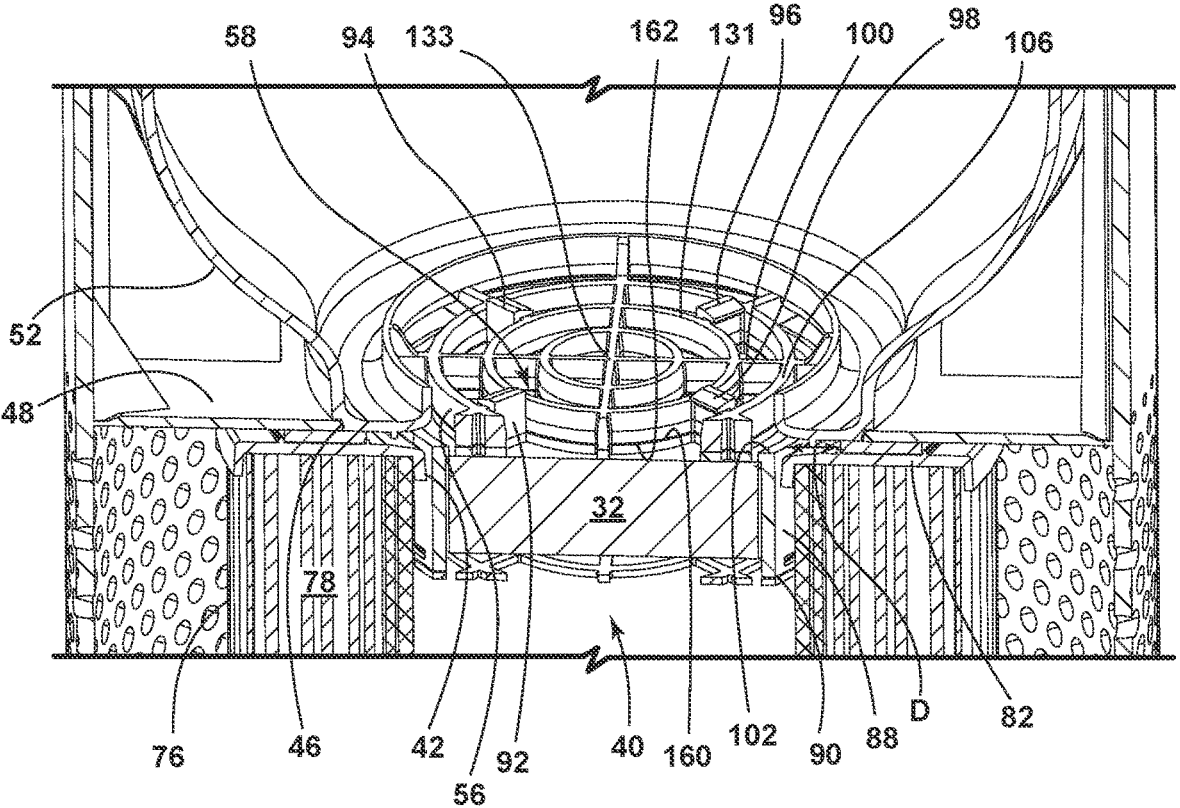
FIG. 5 illustrates a fragmentary cross-sectional view of a media basket removably connecting to a lower fan shroud in accordance with one non-limiting aspect of the present disclosure.

FIG. 5 illustrates a cross-sectional view of the media basket 40 removably connecting to the lower fan shroud 52 in accordance with one non-limiting aspect of the present disclosure. The divider 48 may be a plate having reliefs and other features proximate to the central opening 46 for engaging with the lower fan shroud 52 and/or the lower chamber filter 76. The lower chamber filter 76 may include the ribs/gasket 82 shaped to fit within channels of the divider 48 and a width sufficient to extend a distance D partially into the central opening 46 to overlap part of the lower fan shroud 52. The longitudinal length of the lower chamber filter 76 may be sufficient to compress between the divider 48 and the base 72, i.e., the lower chamber filter 76 may be slightly compressed when the base 72 is attached to the housing 22. The compression may optionally be sufficient to secure the lower chamber filter 76 without the assistance of permanent or removable fasteners other than those described for purposes of positioning and sealing. The corresponding partial overlap of the central opening 46 and the abutting longitudinal length may be beneficial in maximizing airflow through the chamber filter media 78 while also facilitating ease of removal and replacement.

The media basket 40 is shown to include the basket filter media 32 within a confined space defined between an elongated carrier top 88 and a planar carrier bottom 90. The basket filter media 32 is shown to be relatively uniform throughout and to occupy essentially an entirety of the space to maximize the amount of basket filter media 32 available for purification, however, particularly in the case of beads, the basket filter media 32 may occupy more or less of the confined space, have a non-uniformly shaped cross-section, and may include multiple types of basket filter media 32. The media basket 40 may be secured to the covering portion 56 with a plurality of arms 92, 94, 96, 98 extending longitudinally as shown from an outer surface 102. The arms 92, 94, 96, 98 may extend upwardly through a corresponding one of a plurality of gaps 58 included within the covering portion 56. The arms 92, 94, 96, 98 may be equally spaced in a radial manner and concentrically within the central opening 46 to facilitate sliding back and forth over an interior surface 106 of the covering portion 56 in a removable manner, i.e., the arms 92, 94, 96, 98 may be sized and shaped to rotate within the gaps 58 to permit removably attaching and detaching the media basket 40.

The arms 92, 94, 96, 98 may have a width approximating a length between adjoining annular rings 131 of a connected to one of a plurality of spars 100 to limit lateral movement and vibration. The plurality of spars 100, similarly to the arms 92, 94, 96, 98, may be structural components, equally and radially spaced concentrically about a center of the central opening 46 to facilitate offsetting the plurality of annular rings 131. The gaps 58, accordingly, correspond with empty spaces included between the spars 100 and the annular rings 131 and vary in dimension according to distance from a center 133 of the central opening 46. The generally circular or cylindrical shaped configuration of the air purifier 10 is believed to be beneficial in maximizing purification due to the circularity minimizing disruption to airflow when circulating between the lower and upper chambers 16, 18. The circularity is also believed to be beneficial in maximizing surface areas of the basket filter media 32 and the chamber filter media 78 available for interaction with the airflow. The air purifier 10, of course, may be constructed of non-circular shapes and configurations without deviating from the scope and contemplation of the present disclosure, e.g., the covering portion 56, the basket filter media 32, and/or the lower chamber filter 76 may include corners, angels, and/or other non-circular features.

Figure 6:
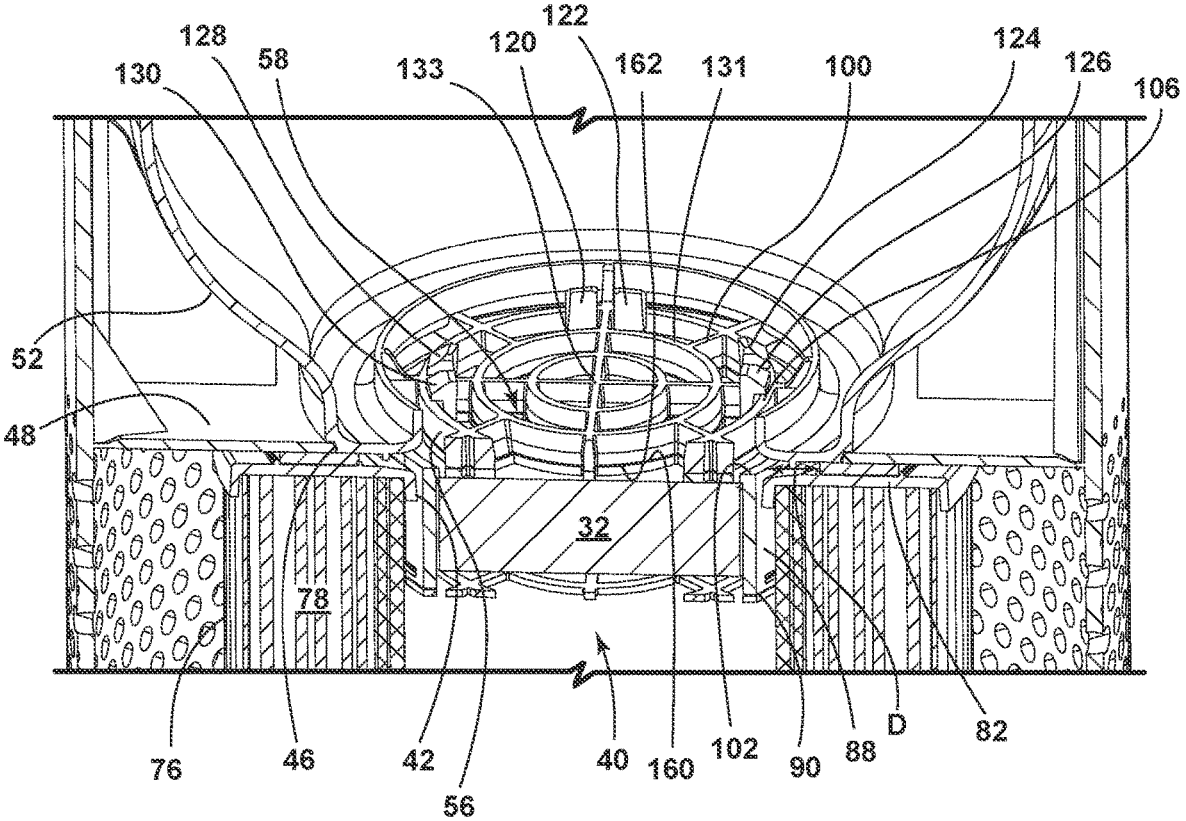
FIG. 6 illustrates a fragmentary cross-sectional view of a media basket permanently connecting to a lower fan shroud in accordance with one non-limiting aspect of the present disclosure.

FIG. 6 illustrates a cross-sectional view of the media basket 40 permanently connecting to the lower fan shroud 52 in accordance with one non-limiting aspect of the present disclosure. The media basket 40 includes a plurality of radially and equally spaced apart arms 120, 122, 124, 126, 128, 130 extending through the gaps 58 for securement with the covering portion 56. The arms 120, 122, 124, 126, 128, 130 may be arranged in pairs such that each pair abuts the same spar 100 and clips to the same annular ring 131. Once attached, the arms 120, 122, 124, 126, 128, 130 may be unable to be rotate out of engagement with the covering portion 56, and as a consequence, may be considered to be permanently attached. The arms 120, 122, 124, 126, 128, 130 may be deflected during insertion and thereafter biased outwardly to maintain a secure connection with the covering portion 56. This connection, of course, can be overcome by breaking off a distal end of the arms and/or by reversing the outward bias, however, especially due to the enclosed nature of the lower fan shroud 52 and the infeasibility of breaking off the distal ends, nonetheless effectively characterizes the attachment as permanent.

Figure 7:
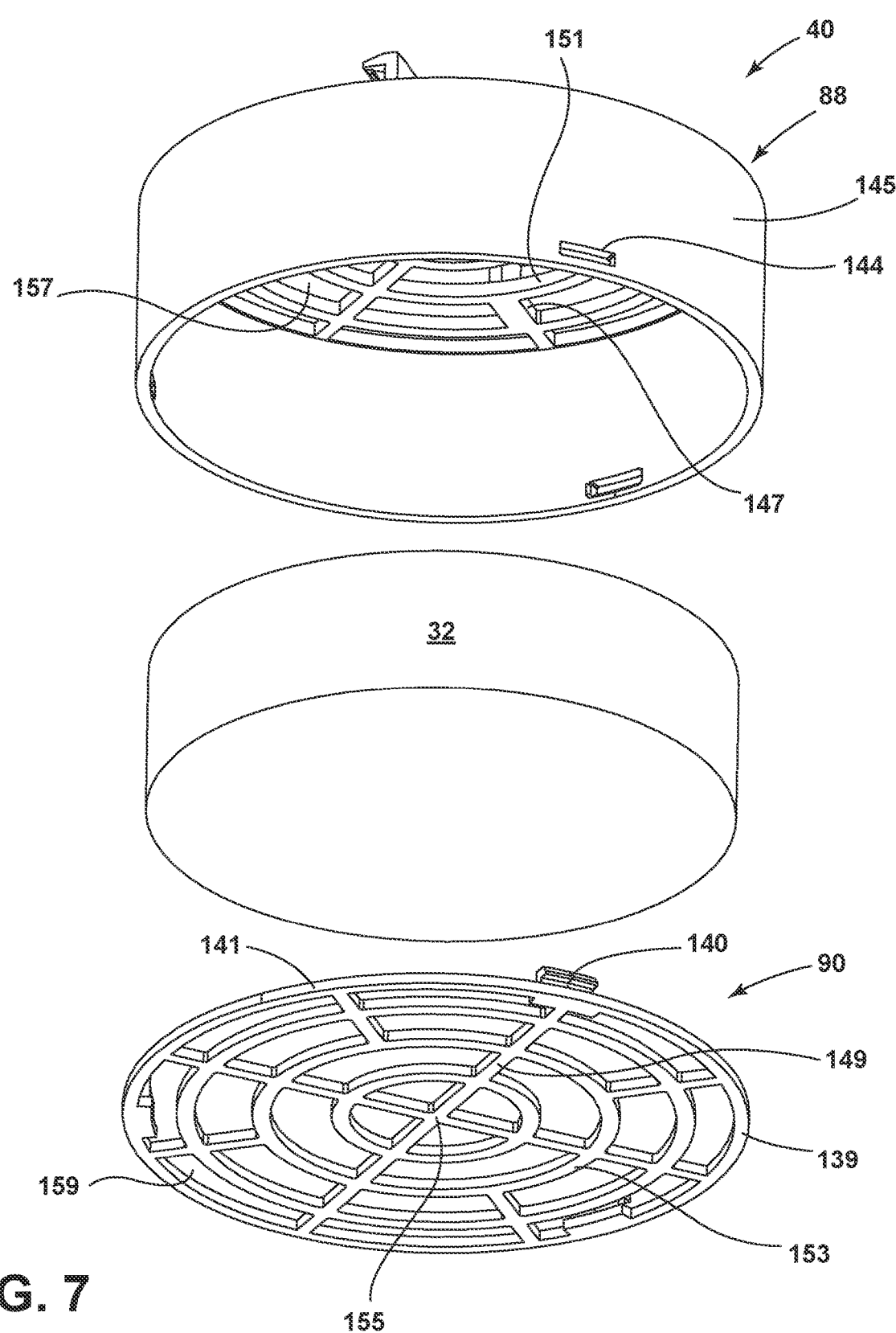
FIG. 7 illustrates an exploded assembly view of a media basket in accordance with one non-limiting aspect of the present disclosure.

FIG. 7 illustrates an assembly view of a media basket 40 in accordance with one non-limiting aspect of the present disclosure. The basket filter media 32 may be retained within a confined space defined between the carrier top and bottom 88, 90. The carrier bottom 90 may include a planar bottom surface 139 and tabs 140 on a top surface 141 having tabs 140. The tabs 140 may be configured to removably engage with reliefs 144 of the carrier top 88 to permit removal and replacement of the basket filter media 32. Such replacement may occur by removing the entire media basket 40, e.g., when the removable arms 92, 94, 96, 98 are employed, and/or by disconnecting the carrier bottom while the carrier top 88 remains attached to the covering portion 56, e.g., when the non-removable arms 120, 122, 124, 126, 128, 130, 132, 134 are employed. The carrier top 88 may include closed side surfaces 145 shaped as a solid body to constrain airflow through an entirety of the basket filter media 32. The basket filter media 32 may be comprised of a variety of materials, compositions, substances, etc. depending on the application to be performed such that the makeup and construction of the basket filter media 32 may vary on a case-by-case basis according to the type of purification to be performed.

The carrier top 88 and bottom 90 are shown to include a plurality of spars 147, 149 extending from a center 155 and a plurality of annular rings 151, 153 concentrically spaced about the center 155. The spars and rings 147, 149, 151, 153 may be comprised of a suitable plastic or other material and used to define a plurality of empty spaces or apertures 157, 159. The spars and rings 147, 149, 151, 153 may optionally align with the gaps 58 included within the covering portion 56 when the media basket 40 is fully attached. The correspondence in cross-sectional area of the gaps 58 and the apertures in 157, 159 the carrier top and bottom 88, 90 may be beneficial in maximizing airflow. The arms necessarily obstruct a slight amount of the cross-sectional area, however, that amount is believed to be relatively insignificant to overall purification performance. The carrier top and bottom 88, 90 may include other shapes and sizes and differing patterns for the apertures 157, 159, e.g., less spars 151, 153 and/or spars and rings 151, 153, 157, 159 having a non-matching relationship to the gaps 58 in the covering portion 56.

Figure 8:
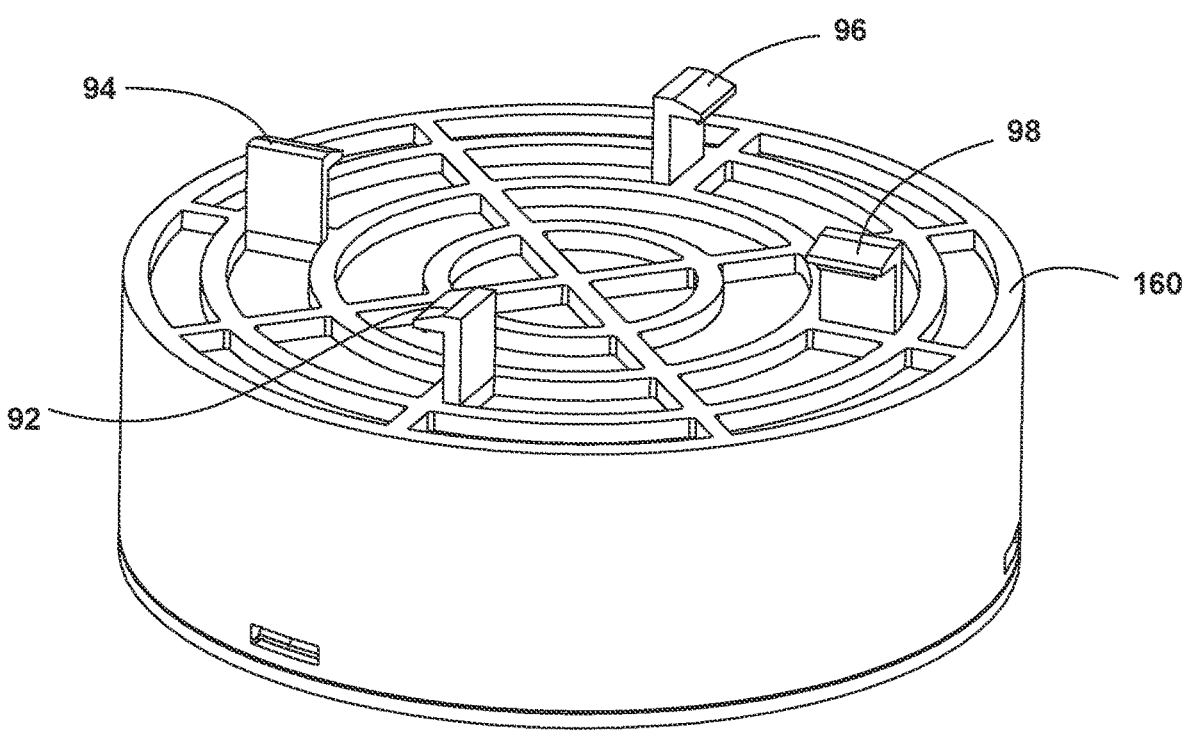
FIGS. 8-9 illustrate additional perspective and side views of a media basket in accordance with one non-limiting aspect of the present disclosure.
Figure 9:
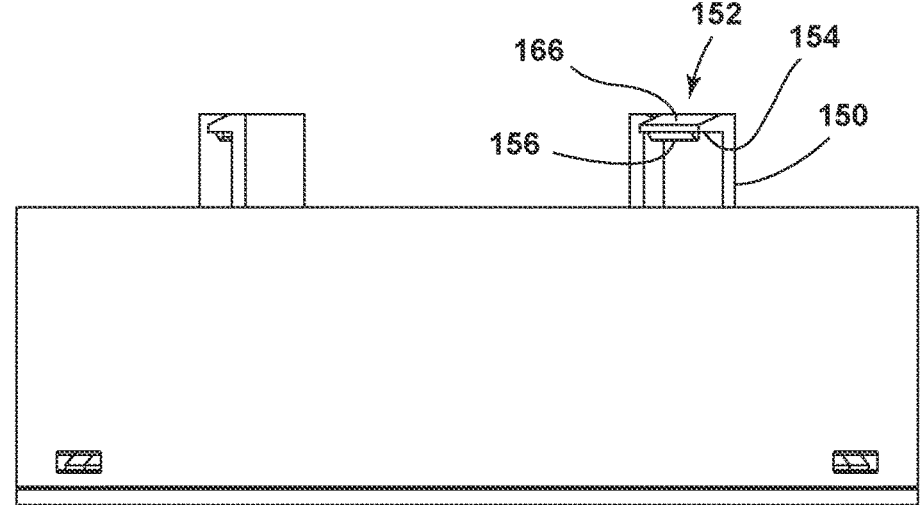

FIGS. 8-9 illustrate additional views of the media basket 40 having the removable arms 92, 94, 96, 98 in accordance with one non-limiting aspect of the present disclosure. The arms 92, 94, 96, 98 may include an elongated body 150 having a bracket 152 at a distal end. The bracket 152 may include a generally planar surface 154 with an overhang 156 at one end for engaging the spars 100. The overhang 156 may be sufficiently spaced from the body 150 to clip and unclip to the corresponding spar 100. Once snapped to the spar 100, the planar surface 154 may provide a compressive fit with the covering portion 56 such that a top surface 160 of the carrier top 88 is pressed against or abutted with an exterior surface 162 of the covering portion 56. A top 166 of the bracket 152 may include a slope shaped to temporarily deflect the arm 96 should the arm 96 be inserted into contact with one of the spars. The ability to rotate the arms 92, 94, 96, 98 into engagement with the spars may obviate a need for including the slope.

Figure 10:
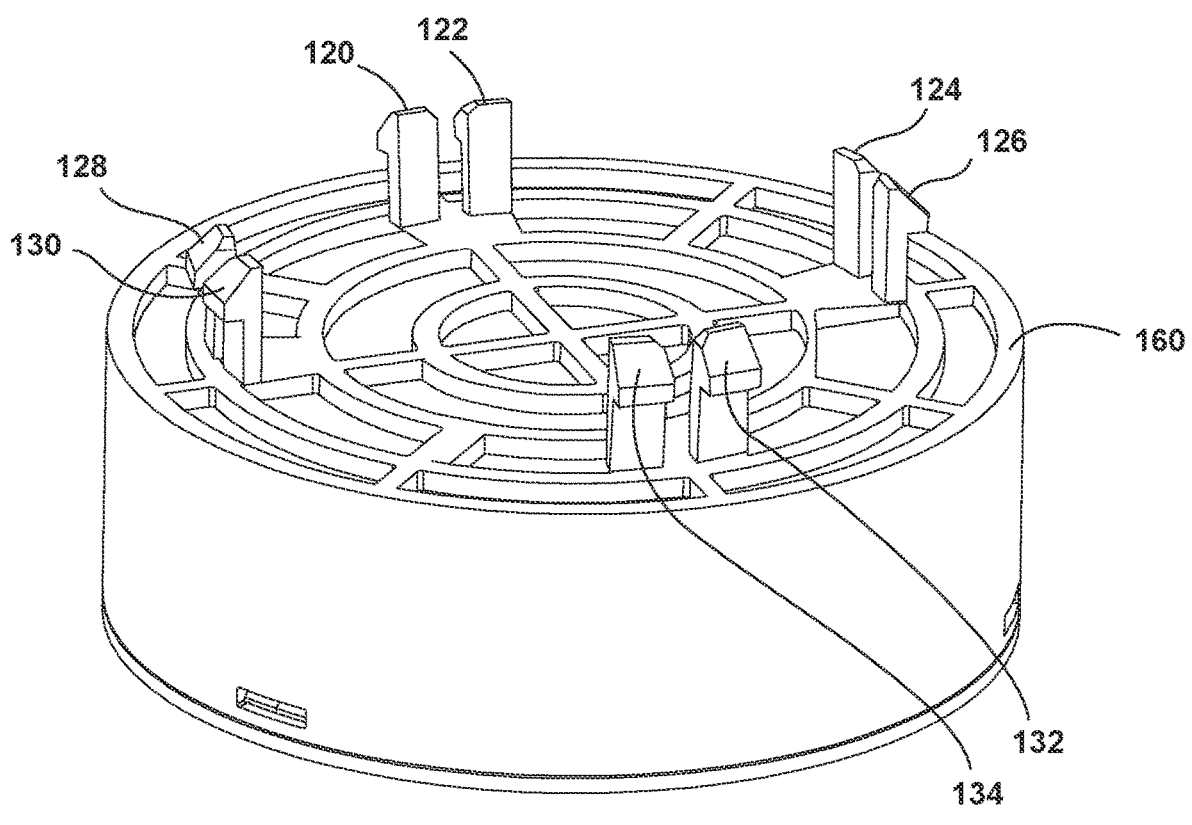
FIGS. 10-11 illustrate additional perspective and side views of a media basket in accordance with one non-limiting aspect of the present disclosure.
Figure 11:
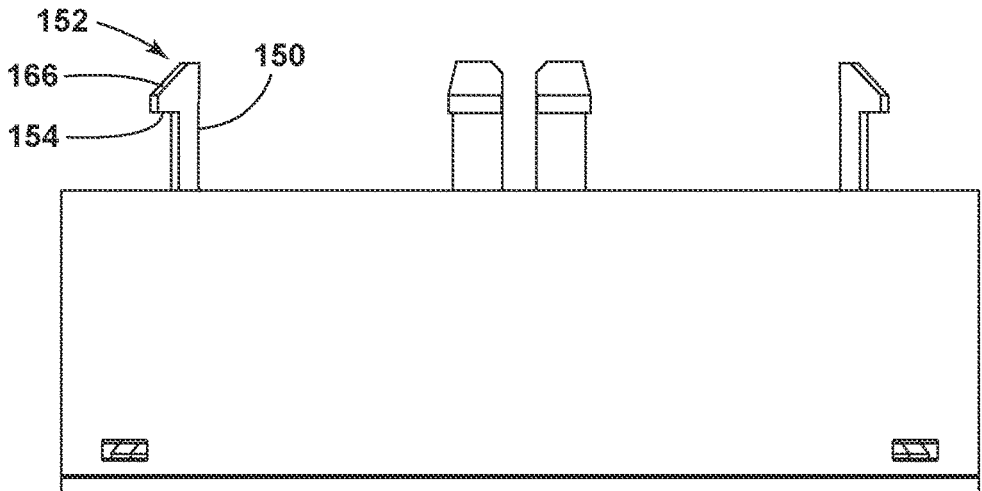

FIGS. 10-11 illustrate additional views of the media basket 40 having the non-removable arms 120, 122, 124, 126, 128, 130, 132, 134 in accordance with one non-limiting aspect of the present disclosure. The arms 120, 122, 124, 126, 128, 130, 132, 134 may include the elongated body 150 having the bracket 152 at a distal end similar to that described above. The bracket 152 may include the generally planar surface 154, which optionally as shown may omit the overhang 156, such that, once seated relative to the spars 100, the planar surface 154 may provide a compressive fit with the covering portion 56 such that the top surface 160 of the carrier top 88 is pressed against or abutted with the exterior surface 162 of the covering portion 56. The top 166 of the bracket 152 may include a slope shaped to temporarily deflect the arm from contact with one of the annular rings during insertion whereafter a bias of the arms may deflect the bracket outwardly to rest on top of the corresponding annular ring. A similar type of connection, e.g., compression fit between the media basket 40 in the lower fan shroud 52, may be achieved through other types of fasteners and configurations without deviating from the scope and contemplation of the present disclosure. One such variation may include staggering the arms such that the arms are non-radially aligned and/or positioned further inboard or outboard from each other, e.g., having the arms extend from different annular rings.

Figure 12:
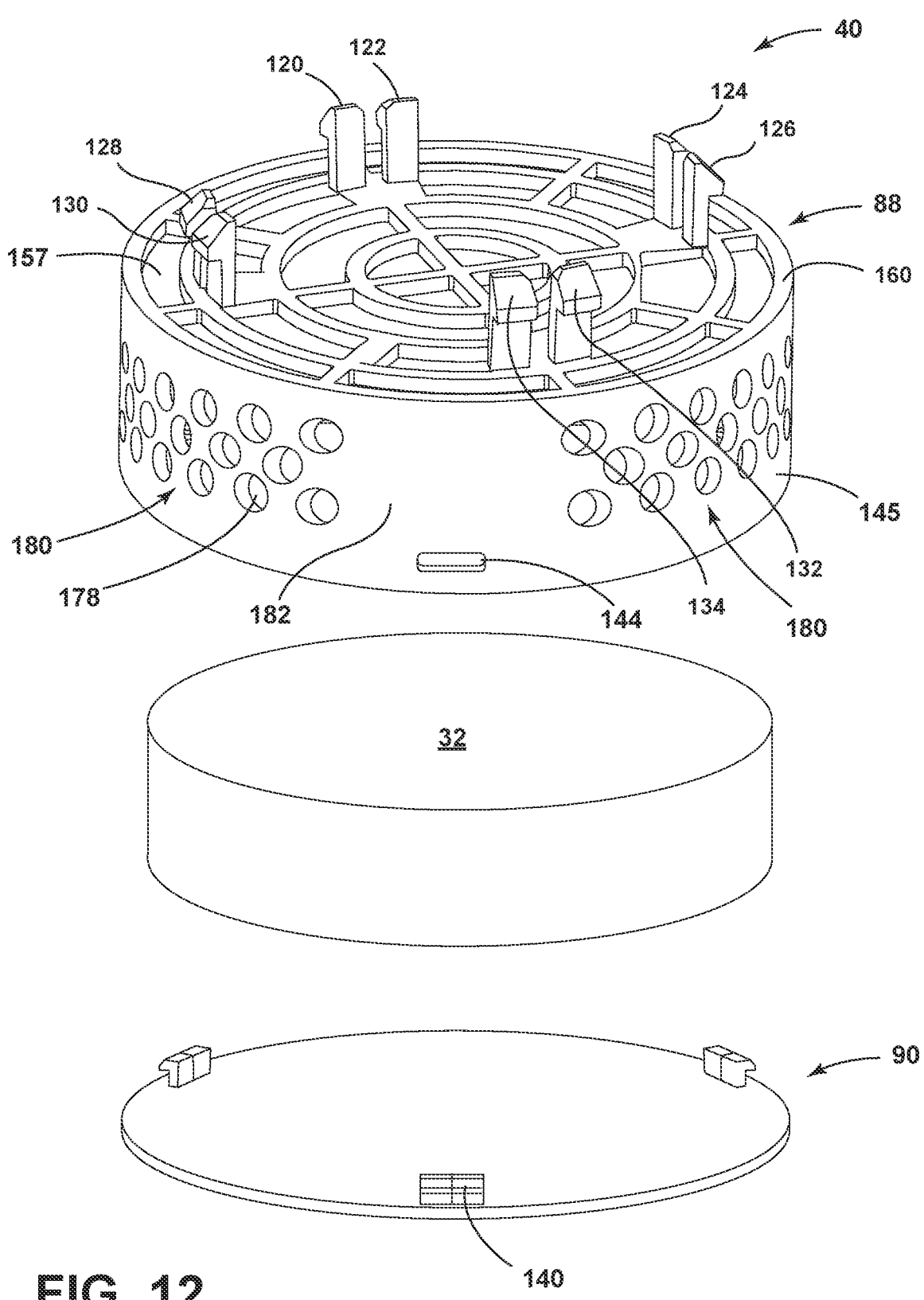
FIG. 12 illustrates an exploded assembly view of a media basket in accordance with one non-limiting aspect of the present disclosure.

FIG. 12 illustrates an exploded assembly view of a media basket 40 in accordance with one non-limiting aspect of the present disclosure. The media basket 40 may include the plurality of apertures 157 through the top surface 160 and a plurality of apertures 178 through the side surface 145. The apertures 157, 178 may cooperate with a solid, non-aperture construction of the carrier bottom 90 to limit airflow through the media filter 32 to a generally side flow characterized by the airflow entering through the side apertures 178 and exiting through the top apertures 157. The ability to produce the side airflow may be beneficial in venting when the filter media 32 includes fragrance beads and/or carbon pellets as such a configuration may prevent fragrance beads and/or dust generated from vibrating pellets falling through the bottom 90. The construction of some filter medias 32 may also benefit as well from the side airflow enabling greater interaction with the filter media 32 than if the airflow were traveling a more direct, straight route from top to bottom.

The side apertures 178 may optionally be arranged in clusters 180 with a solid or non-apertured offset 182 between the clusters 180. The clusters may include repeating patterns or groups of apertures 178 equally spaced around the exterior, perimeter of the side surface 145. The arrangement of the clusters 180, and optionally a size of the corresponding apertures 178, may be selected to be smaller than fragrance beads and/or to establish a particular route for the side airflow. The offsets 182 may optionally correspond with internal structure of the filter media 32, such as to separate parts of the filter media 32 from each other when multiple types of filter media 32 are simultaneously used and/or to provide interior attachment locations for the filter media 32 when included within a frame, a pod, or another type of holder. An inside surface corresponding with the offsets 182 may include channels, clips, or other types of features to facilitate attaching or aligning the filter media 32. These features may be used to hold the filter media 32 in the media basket 40 during replacement, which may be beneficial in the illustrated embodiment where the arms 120, 122, 124, 126, 128, 130, 132, 134 permanently attach to the lower fan shroud 52.

Figure 13:
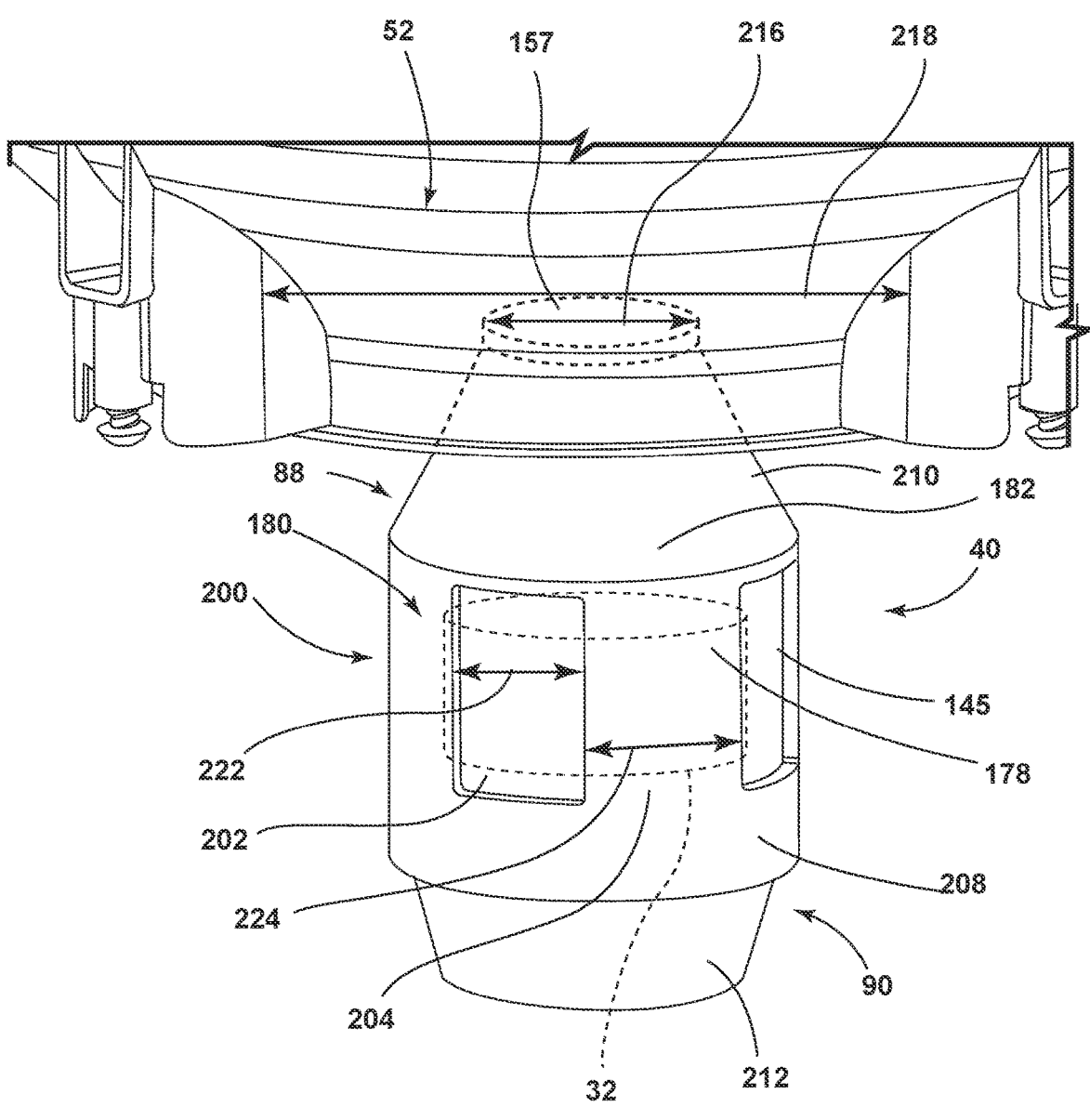
FIG. 13 illustrates a perspective view of a media basket in accordance with one non-limiting aspect of the present disclosure.

FIG. 13 illustrates a perspective view of a media basket 40 in accordance with one non-limiting aspect of the present disclosure. The media basket 40 may include a shutter 200 configured to rotate about the exterior of the side surface 145. The shutter made 200 may include a plurality of windows 202 interspersed between a plurality of shields 204 where the windows and shields 202, 204 are movable to facilitate selectively covering and uncovering one or more of the side apertures 178. The offset 182 between the aperture clusters 180 may include a width equal to a width 222 of the window 202 and/or a width 224 of the shield 204 in order to provide a dimensional relation therebetween. A threaded connection 208 may be employed to facilitate attaching the shutter 200 in a rotatable manner. The threaded connection 208 may optionally cooperate with threads included on the carrier top 88 and the carrier bottom 90 to facilitate removably connecting the top and bottom 88, 90 together. The threaded connection 208 is shown for exemplary, non-nonlimiting purposes as other connection mechanisms may be similarly employed to facilitate selectively positioning the shutter 200 relative to the apertures 178, e.g., the shutter 200 may be a band or a clamp that snap fits over the side surface 145 or a slide that is moveable within a pocket or other opening to the filter media 32.

The carrier top and bottom 88, 90 are shown to include conical portions 210, 212 where the upper conical portion 210 includes the apertures 157 and the lower conical portion 212 includes a solid, non-aperture construction. The lower conical portion 212 may be removable to permit a user to refill the basket filter media 32. The upper, conical portion 210 is shown to include a smaller diameter 216 than a diameter 218 of the opening 46. The smaller diameter 216 may be useful in permitting some of the airflow to pass through without first passing through the filter media 32. The smaller diameter 216 may also be useful with fragranced beads as the smaller size, and optionally less amount of the airflow passing therethrough, which may enable precise control of the fragrances imparted to the airflow. The smaller diameter 216 may also represent a relatively smaller size of the media basket 40 in comparison to the chamber filter 76 may enable a user to easily grasp around an entirety of the media basket 40 when making alterations. The media basket 40 is shown for exemplary purposes as being integral with or formed as part of the lower shroud 52 as the media basket 40 may instead be removably attached as described above, e.g., with the use of arms, or attached in another manner, such as with another threaded connection.

The following Clauses provide example configurations of an air purifier and a media basket disclosed herein.

Clause 1. A vertical airflow air purifier comprising: a housing; a divider separating an interior volume of the housing into an upper chamber and a lower chamber, the divider including a central opening to provide an airflow passageway between the upper and lower chambers; a motorized fan assembly disposed within the upper chamber above the central opening, the motorized fan being configured to draw air from the lower chamber; a lower fan shroud disposed between the fan assembly and the divider, the fan shroud having a covering portion configured to cover a cross-sectional area of the central opening, the covering portion including a plurality of gaps to permit airflow therethrough; and a media basket attached to the fan shroud, the media basket including a basket filter media to filter airflow passing through the gaps.

Clause 2. The air purifier according to clause 1 wherein the media basket includes an elongated carrier top connected to a planar carrier bottom, the basket filter media being disposed within a confined space created between the carrier top and the carrier bottom.

Clause 3. The air purifier according to any of clauses 1-2 wherein the carrier top includes a plurality of elongated arms configured to attach the media basket to the fan shroud, the arms extending longitudinally from an outer surface of the carrier top in a direction away from the basket filter media.

Clause 4. The air purifier according to any of clauses 1-3 wherein each arm fits through one of the gaps such that a bracket at a distal end thereof snap fits overtop of an interior surface of the fan shroud to provide a compressive fit between the outer surface of the carrier top and an exterior surface of the covering portion.

Clause 5. The air purifier according to any of clauses 1-4 wherein a bottom of the brackets in contact with the interior surface is generally planar with an overhang at one end such that the media basket slides back-and-forth over the interior surface to clip and unclip from the fan shroud in a removable manner.

Clause 6. The air purifier according to any of clauses 1-4 wherein a bottom of the brackets in contact with the interior surface is generally planar and biased such that the media basket is characterized as being permanently attached to the fan shroud.

Clause 7. The air purifier according to any of clauses 1-6 wherein the carrier top and bottom includes a plurality of apertures shaped to match the gaps of the fan shroud such that the gaps in the fan shroud beyond or outside of the arms are unobstructed by the carrier top and bottom when the media basket is snap fit to the fan shroud.

Clause 8. The air purifier according to any of clauses 1-7 wherein the fan shroud includes a plurality of spars to structurally support and radially offset a plurality of concentric annular rings, the gaps corresponding with empty spaces in the fan shroud between the spars and annular rings.

Clause 9. The air purifier according to any of clauses 1-8 wherein each arm snap fits to one of the spars and includes a width approximately equal to a length of the snapped-to spar.

Clause 10. The air purifier according to any of clauses 1-8 wherein each arm snap fits to one of the annular rings and includes a width less than a length of the snapped-to annular ring.

Clause 11. The air purifier according to any of clauses 1-8 wherein the arms attach to the fan shroud in pairs such that each pair abuts an opposite side of the same spar.

Clause 12. The air purifier according to any of clauses 1-11 further comprising an additional filter positioned within the lower chamber to an underside of the divider and extending longitudinally therefrom throughout the lower chamber, the additional filter having a hollow interior surrounded with an additional media to filter airflow therethrough.

Clause 13. The air purifier according to any of clauses 1-12 wherein at least part of both the carrier bottom and the basket filter media is disposed within the hollow interior below a gasket of the additional filter.

Clause 14. The air purifier according to any of clauses 1-13 wherein the lower chamber includes a plurality of perforations to provide intake pathways for air to flow into the interior volume.

Clause 15. The air purifier according to any of clauses 1-14 wherein, when the motorized fan assembly is running, the air flows from an ambient environment through the perforations and thereafter travels in order through the additional media and the basket filter media before passing through the gaps into the upper chamber whereafter the resulting airflow exhausts back toward the ambient environment through one or more slots in the upper chamber.

Clause 16. The air purifier according to any of clauses 1-15 wherein the basket filter media is comprised of fragranced polyurethane beads or a passive catalyst.

Clause 17. The air purifier according to any of clauses 1-6 and 8-16 wherein the media basket includes a plurality of apertures therethrough to direct airflow through the basket filter media.

Clause 18. The air purifier according to any of clauses 1-6 and 8-17 wherein a portion of the apertures extend through a top surface of the carrier top and a portion of the apertures extend through a bottom surface of the carrier bottom.

Clause 19. The air purifier according to any of clauses 1-6 and 8-18 wherein a side surface of the carrier top is a solid body configured to limit airflow through the apertures in the top surface and the bottom surface.

Clause 20. The air purifier according to any of clauses 1-6 and 8-17 wherein a top surface of the carrier top includes a portion of the apertures and a side surface of the carrier top includes a portion of the apertures.

Clause 21. The air purifier according to any of clauses 1-6 and 8-20 wherein the carrier bottom is a solid body configured to limit airflow through the apertures in the side and top surfaces of the carrier top.

Clause 22. The air purifier according to any of clauses 1-6 and 8-21 wherein the basket includes a shutter configured to selectively cover one or more of the apertures through the side surface.

Clause 23. The air purifier according to any of clauses 1-6 and 8-22 wherein the shutter includes one or more windows interspersed between one or more shields.

Clause 24. The air purifier according to any of clauses 1-6 and 8-23 wherein the shutter is configured to rotate about an exterior of the side surface to selectively position the windows and shields relative to the apertures through the side surface to thereby control airflow through the basket.

Clause 25. The air purifier according to any of clauses 1-6 and 8-24 wherein the apertures through the side surface are arranged into a plurality of clusters with solid, non-apertured offsets between each of the clusters.

Clause 26. The air purifier according to any of clauses 1-6 and 8-25 wherein the offsets are approximately equal in width to at least one of the windows and/or shields.

Clause 27. A media basket assembly for use with an air purifier, the assembly comprising: a filter media configured to filter airflow through the air purifier; and a basket configured to attach to a lower fan shroud of the air purifier, the filter media being disposed within an interior volume of the basket.

Clause 28. The media basket assembly according to clause 27 wherein the basket includes a plurality of apertures to direct airflow through the filter media.

Clause 29. The media basket assembly according to any of clauses 27-28 wherein a portion of the apertures extend through a top surface of the basket, a portion of the apertures extend through a bottom surface of the basket, and a side surface of the basket is a solid body.

Clause 30. The media basket assembly according to any of clauses 27-28 wherein a top surface of the basket includes a portion of the apertures, a side surface of the basket includes a portion of the apertures, and a bottom of the basket is a solid body.

Clause 31. The media basket assembly according to any of clauses 27-30 wherein the basket includes a shutter configured to selectively cover one or more of the apertures, the shutter including one or more windows interspersed between one or more shields.

Clause 32. The media basket assembly according to any of clauses 27-28 and 30-31 wherein the shutter is configured to rotate about the basket to selectively position the windows and shields relative to the apertures to thereby control airflow through the basket.

Clause 33. The media basket assembly according to any of clauses 27-32 wherein the basket includes an elongated carrier top attached to a planar carrier bottom, the interior volume corresponding with a confined space created between the carrier top and the carrier bottom.

Clause 34. The media basket assembly according to any of clauses 27-33 wherein the basket includes a plurality of arms configured to be rotatably and removably attached to spars included on the lower fan shroud.

Clause 35. The media basket assembly according to any of clauses 27-33 wherein the basket includes a plurality of arms configured to be permanently attached to annular rings included on the lower fan shroud.

Clause 36. A media basket assembly for use with an air purifier, the air purifier having a motorized fan disposed within a housing above a divider, the divider having a circular opening to provide an airflow passageway between upper and lower chambers of the housing, the air purifier including a lower fan shroud having a covering portion shaped to cover a cross-sectional area of the circular opening, the covering portion including a plurality of spars to structurally support and radially offset a plurality of concentric annular rings such that gaps therebetween provide empty spaces for airflow, the media basket assembly comprising: a filter media configured to filter airflow through the air purifier, the filter media having a cross-sectional width shaped to cover substantially all of the cross-sectional area of the covering portion; and a basket configured to position the filter media relative to the gaps, the basket including the filter media disposed within an interior and a plurality of arms longitudinally extending from an exterior, the arms being shaped to fit through the gaps to position a distal end to snap fit the basket to the fan shroud.

To assist and clarify the description of various embodiments, various terms are defined herein. Unless otherwise indicated, the following definitions apply throughout this specification (including the claims). Additionally, all references referred to are incorporated herein in their entirety.

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments

What is claimed is:

1. A media basket assembly for use with an air purifier, comprising:
   a filter media configured to filter airflow through the air purifier; and
   a basket configured to attach to a lower fan shroud of the air purifier, the filter media being disposed within an interior volume of the basket, wherein the basket includes a plurality of apertures to direct airflow through the filter media and the basket includes a shutter configured to selectively cover one or more of the plurality of apertures, the shutter including one or more windows interspersed between one or more shields.

2. The media basket assembly according to claim 1 wherein a portion of the apertures extend through a top surface of the basket, a portion of the apertures extend through a bottom surface of basket, and a side surface of the basket is a solid body.

3. The media basket assembly according to claim 1 wherein a top surface of the basket includes a portion of the apertures, a side surface of the basket includes a portion of the apertures, and a bottom of the basket is a solid body.

4. The media basket assembly according to claim 1 wherein the shutter is configured to rotate about the basket to selectively position the windows and shields relative to the apertures to thereby control airflow through the basket.

5. The media basket assembly according to claim 1 wherein the basket includes an elongated carrier top attached to a planar carrier bottom, the interior volume corresponding with a confined space created between the carrier top and the carrier bottom.

6. The media basket assembly according to claim 1 wherein the basket includes a plurality of arms configured to be rotatably and removably attached to spars included on the lower fan shroud.

7. The media basket assembly according to claim 1 wherein the basket includes a plurality of arms configured to be permanently attached to annular rings included on the lower fan shroud.

8. A vertical airflow air purifier comprising:
   a housing;
   a divider separating an interior volume of the housing into an upper chamber and a lower chamber, the divider including a central opening to provide an airflow passageway between the upper and lower chambers;
   a motorized fan assembly disposed within the upper chamber above the central opening, the motorized fan being configured to draw air from the lower chamber;
   a fan shroud disposed between the fan assembly and the divider, the fan shroud having a covering portion configured to cover a cross-sectional area of the central opening, the covering portion including a plurality of gaps to permit airflow therethrough; and
   a media basket attached to the fan shroud, the media basket including a basket filter media to filter airflow passing through the gaps, wherein the media basket includes an elongated carrier top connected to a planar carrier bottom, the basket filter media being disposed within a confined space created between the carrier top and the carrier bottom, the carrier top includes a plurality of elongated arms configured to attach the media basket to the fan shroud, the arms extending longitudinally from an outer surface of the carrier top in a direction away from the basket filter media, and each arm fits through one of the gaps such that a bracket at a distal end thereof snap fits overtop of an interior surface of the fan shroud to provide a compressive fit between the outer surface of the carrier top and an exterior surface of the covering portion.

9. The air purifier according to claim 8 wherein a bottom of the brackets in contact with the interior surface is generally planar with an overhang at one end such that the media basket slides back-and-forth over the interior surface to clip and unclip from the fan shroud in a removable manner.

10. The air purifier according to claim 8 wherein a bottom of the brackets in contact with the interior surface is generally planar and biased such that the media basket is characterized as being permanently attached to the fan shroud.

11. The air purifier according to claim 8 wherein the carrier top and bottom includes a plurality of apertures shaped to match the gaps of the fan shroud such that the gaps in the fan shroud beyond or outside of the arms are unobstructed by the carrier top and bottom when the media basket is snap fit to the fan shroud.

12. The air purifier according to claim 8 further comprising an additional filter positioned within the lower chamber to an underside of the divider and extending longitudinally therefrom throughout the lower chamber, the additional filter having a hollow interior surrounded with an additional media to filter airflow therethrough.

13. A vertical airflow air purifier comprising:

a housing;

a divider separating an interior volume of the housing into an upper chamber and a lower chamber, the divider including a central opening to provide an airflow passageway between the upper and lower chambers;

a motorized fan assembly disposed within the upper chamber above the central opening, the motorized fan being configured to draw air from the lower chamber;

a fan shroud disposed between the fan assembly and the divider, the fan shroud having a covering portion configured to cover a cross-sectional area of the central opening, the covering portion including a plurality of gaps to permit airflow therethrough; and a media basket attached to the fan shroud, the media basket including a basket filter media to filter airflow passing through the gaps, wherein the fan shroud includes a plurality of spars to structurally support and radially offset a plurality of concentric annular rings, the gaps corresponding with empty spaces in the fan shroud between the spars and annular rings.

* * * * *